US009857068B2

(12) United States Patent
Nguyen et al.

(10) Patent No.: US 9,857,068 B2
(45) Date of Patent: Jan. 2, 2018

(54) LED LIGHTING SYSTEM AND OPERATING METHOD FOR IRRADIATION OF PLANTS

(71) Applicants: Ken Nguyen, Danbury, CT (US); Rick DePalma, Ridgefield, CT (US); Ming Zhang, Weston, CT (US); Matthew Steinbroner, Newtown, CT (US)

(72) Inventors: Ken Nguyen, Danbury, CT (US); Rick DePalma, Ridgefield, CT (US); Ming Zhang, Weston, CT (US); Matthew Steinbroner, Newtown, CT (US)

(*) Notice: Subject to any disclaimer, the term of this patent is extended or adjusted under 35 U.S.C. 154(b) by 127 days.

(21) Appl. No.: 15/048,871

(22) Filed: Feb. 19, 2016

(65) Prior Publication Data

US 2017/0241632 A1     Aug. 24, 2017

(51) Int. Cl.

| | |
|---|---|
| F21V 29/58 | (2015.01) |
| F21V 15/015 | (2006.01) |
| F21V 31/00 | (2006.01) |
| F21V 3/04 | (2006.01) |
| F21V 23/02 | (2006.01) |
| F21V 23/00 | (2015.01) |
| F21V 29/67 | (2015.01) |
| A01G 7/04 | (2006.01) |

(Continued)

(52) U.S. Cl.
CPC ............. *F21V 29/59* (2015.01); *A01G 7/045* (2013.01); *F21V 3/04* (2013.01); *F21V 15/015* (2013.01); *F21V 23/003* (2013.01); *F21V 23/02* (2013.01); *F21V 29/673* (2015.01); *F21V 31/005* (2013.01); *F21Y 2113/10* (2016.08); *F21Y 2115/10* (2016.08)

(58) Field of Classification Search
CPC .......... F21V 29/59; F21V 29/673; F21V 3/04; F21V 15/015; F21V 21/025; F21V 21/00; F21V 23/003; F21V 23/02; F21V 31/005; A01G 7/045; A01G 9/26; F21Y 2113/10; F21Y 2115/10

See application file for complete search history.

(56) References Cited

U.S. PATENT DOCUMENTS 3,869,605 A * 3/1975 Davis ..................... A01C 1/02
362/264
8,358,097 B2 * 1/2013 Cartwright ............ A01G 9/26
318/3

(Continued)

OTHER PUBLICATIONS

Which Regions of the Electromagnetic Specrum Do Plants Use to Drive Photosynthesis?, www.heliospectra.com, Oct. 5, 2012.

*Primary Examiner* — Bao Q Truong
(74) *Attorney, Agent, or Firm* — Edward L. Kelley; Invention Management Associates Inc.

(57) ABSTRACT

An LED illumination system is operable to irradiate plant materials with photosynthetically active radiation. A lighting assembly includes a plurality of different LED types. Each LED lamp has a different spectral power matched to an absorption peak of the plant materials. All of the LED lamps of each different lamp type are driven by a different dedicated power source. Each power source can be independently modulated to vary the collective spectral power output of the LED illumination system. The lighting assembly includes fluid conduits disposed proximate to the LED lamps and a cooling fluid is flowed through the fluid conduits to removed thermal energy from the LED lamps.

22 Claims, 9 Drawing Sheets

(51) Int. Cl.
*F21Y 115/10* (2016.01)
*F21Y 113/10* (2016.01)

(56) References Cited

U.S. PATENT DOCUMENTS

| | | | |
|---|---|---|---|
| 8,920,001 B2* | 12/2014 | Park | F21V 13/02 |
| | | | 362/235 |
| 2013/0003382 A1 | 1/2013 | Ohura et al. | |
| 2016/0100529 A1* | 4/2016 | Grajcar | A01G 7/045 |
| | | | 47/17 |

* cited by examiner

LED LIGHTING SYSTEM AND OPERATING METHOD FOR IRRADIATION OF PLANTS

1.1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2016 G S Thermal Solutions.

1.2 BACKGROUND OF THE INVENTION

1.2.1 Field of the Invention

The exemplary, illustrative, technology herein relates to systems, and methods for irradiating horticultural products using liquid cooled Light Emitting Diode (LED) lighting systems.

1.2.2 The Related Art

Horticultural products are more frequently grown indoors using artificial lighting. Conventional indoor lighting used to irradiate horticultural products is provided by High Intensity Discharge (HID) lamps which includes metal halide and high pressure sodium (HPS) light bulbs. One problem with the HPS light bulbs is that they operated at high temperatures and therefore emit high levels of thermal radiation that tends to excessively heat the indoor space in which they are being used. Additionally, HPS lamps can generate enough thermal radiation to actually damage the plants and therefore HPS lamps need to be sufficiently spaced apart from the horticultural products, e.g. by at least 2 feet and in some cases up to 4 feet (0.3-0.6 Meters) to avoid damaging the plants.

Typically HPS lamps are housed within a reflective enclosure configured to reflect and redirect useful radiant energy being emitted by the lamp toward the horticultural products. However the thermal energy being emitted by the HPS lamps is absorbed by the reflective enclosure which leads to a need to cool the reflective enclosure using a forced airflow. As a result, most indoor growing spaces illuminated by HPS lamps are climate controlled in order to compensate for the high levels of thermal radiation being generated by operating the HPS lamps. The added cost of operating a climate control system just to remove thermal energy emitted by the illumination system is undesirable.

A further problem with HPS light bulbs is the life expectancy. Typically HPS light bulbs are replaced every six (6) months, and the ballast is replaced once per year. The short life expectancy and frequent replacement of HPS lamps leads to high operating costs and there is a need in the art to reduce irradiation operating costs by providing a longer lasting light source.

Another problem with convention HID discharge lamps is that the spectral power of the emitted radiation is incompatible with the needs of the horticultural products. HID lamps each have a standard spectral power that includes significant radiant energy at wavelengths that provide no useful benefit to horticultural product growth. This is demonstrated in FIG. 8 which provides a graphical comparison (800) between the relative spectral absorption of plant material vs wavelength of the spectral energy and the relative spectral power vs wavelength of a conventional HPS light source.

Photosynthesis relies on pigments (chlorophyll A, chlorophyll B and carotenoids) to absorb light and transfer energy from the absorbed light to the plant. The relative amount of light absorbance by chlorophyll A, chlorophyll B and carotenoids vs wavelength is shown in FIG. 8 in the graphical comparison (800). A first curve, (805) shows the relative absorbance of chlorophyll A vs wavelength. The first curve (805) has a major absorption peak at about 430 nm and another absorption peak at about 700 nm. A second curve (810) shows the relative absorbance of chlorophyll B. The second curve (810) has a main absorption peak at about 460 nm and another absorption peak at about 675 nm. A third curve, (815) shows the relative absorbance of carotenoids vs wavelength. The third curve (815) has a main absorption peak ranging between about 450 and 520 nm and another absorption peak at about 675 nm coincident with an absorption peak of the second curve (810) at about 675 nm.

Thus chlorophyll A, chlorophyll B mainly absorbs violet and blue light at the main absorption peaks and absorb red and deep red light at the secondary absorption peaks. However chlorophyll A and chlorophyll B reflect or transmit green and yellow light having a wavelength spectrum in the range of about 550 to 650 nm. The carotenoids mainly absorb indigo and blue light at the main absorption peak between about 450 and 520 nm and absorb red light at 675 nm. However the carotenoids reflect or transmit yellow and orange light having a wavelength spectrum between about 550 and 650 nm.

To demonstrate the main drawback of conventional HPS light sources used to irradiate horticultural products, the relative spectral power vs. wavelength of a conventional HPS light source is plotted in FIG. 8 on the graphical comparison (800). A fourth curve, (820) shows the relative spectral power vs wavelength of a conventional HPS light source. The fourth curve (820) has a three strong relative spectral power peaks between about 575 and 620 nm with a minor relative spectral power peak between about 460 nm and 480 nm. Thus the majority of the relative spectral power output of a conventional HPS light source is yellow and orange light which is not readily absorbed by any of the three pigments responsible for photosynthesis and is mainly reflected by or transmitted through plant materials. To compensate for this major shortcoming of the conventional indoor lighting systems used to illuminate horticultural products, the HPS lamps are operated at very high power levels to irradiate plant material with enough of the spectral power that is in a useful spectral range for plant growth. In particular, the only spectral power of the HPS lamps that can be absorbed by plant materials is provided by the three minor spectral peaks (830) and the tail of the main spectral peak (835). Otherwise, as is demonstrated by FIG. 8, the majority of the spectral power emitted by the HPS light provides no actual benefit to the plants.

LED lighting systems are known for irradiating plant growth. One such system is disclosed in U.S. Pat. No. 5,012,609 to Ignatuis et al. which describes a plant irradiance system using three different LED lamp types emitting at three different wavelengths. Another such system is disclosed in U.S. Pat. No. 7,933,060 to Dubuc which describes a support structure for uniform light distribution from LED's.

1.3 DEFINITIONS

The following definitions are used throughout, unless specifically indicated otherwise:

| TERM | DEFINITION |
|---|---|
| LED | Light emitting diode |
| HID | High intensity discharge lighting |
| HPS | High pressure sodium light |
| Radiant power (in Watts) (W) | Also called radiant flux is the radiant energy emitted, reflected, transmitted or received, per unit time. In the present invention radiate power is used to describe the total radiant energy emitted by a LED lamp. |
| Spectral power (in Watts/ nanometer) (W/nm) | Also called spectral flux is the radiant power per unit frequency or wavelength. |

1.4 SUMMARY OF THE INVENTION

These and other aspects and advantages will become apparent when the Description below is read in conjunction with the accompanying Drawings.

In particular the present invention provides a lighting assembly comprising that includes at least two and preferably four longitudinal light support beams each having a longitudinal length and each assembled with at least two transverse end beams. Each of the longitudinal light support beams is formed with a base wall having a transverse width and two side walls extending from the base wall. The base wall and the two side walls together form three sides of a lamp cavity that extends substantially along the entire longitudinal length. the lamp cavity has a rectangular cross-section but may be trapezoidal in order to provide a larger cone angle for light being emitted out of the lamp cavity.

An LED lamp support structure is mounted to the base wall inside the lamp cavity substantially along the entire longitudinal length of each of the longitudinal light support beams. Each lamp support structure includes an array of LED lamps mounted to the LED lamp support structure. The array of lamps is distributed substantially along the entire longitudinal length of each of the longitudinal light support beams. Each array may include a single double or large row of LED lamps spaced apart along the longitudinal length. The LED lamps are positioned and oriented in a suitable arrangement to emit as much radiant power out of the lamp cavity and onto the plant materials being irradiated as can be provided.

Each of the longitudinal light support beams includes a fluid conduit thermally conductively coupled to the base wall for conducting a liquid cooling fluid there through. A cooling system that includes a fluid pump and a heat exchanger to pump the liquid cooling fluid through all of the fluid conduits thermally conductively coupled to the base wall and to cycle the cooling fluid through the heat exchanger.

The plurality of LED lamps includes a plurality of different LED lamp types each emitting a different spectral power. Each array of lamps includes a blue LED lamps having a main spectral power output in a spectral range of 425 to 470 nm, a plurality of red LED lamps having a main spectral power output in a spectral range of 620 to 650 nm, a plurality of deep red LED lamps having a main spectral power output in a spectral range of 660 to 680 nm and a plurality of white LED lamps having a main spectral power output in a spectral range of 420 to 620 nm. Other LED lamp types may also be used to expand the combined spectral power output to include different spectral power such as an ultraviolet LED lamp type having a main spectral power output in a spectral range of 380 to 420 and or an infrared LED lamp type having a main spectral power output in a spectral range of 730 to 770 nm. Generally the combined spectral power or regions of the spectral power can be selected to suit the irradiation needs optical absorption of different horticultural products.

A lamp power module includes a plurality of different DC power sources and each DC power source is electrically interfaced to all of the LED lamps of only one of the plurality of different LED types. An electronic controller including a data processor and a memory module operates each of the different DC power sources independently to vary the radiant power output of any one of the different LED types. In particular since all of the LED lamps of a given LED type is power by a single DC power source, modulating the DC power source output varies the radian power output of all of the connected LED lamps at the same time to either turn all of the LED lamps of a given type completely off, drive all of the lamps for maximum radiant power output or to drive of the lamps at an intermediate radiant power level.

1.5 BRIEF DESCRIPTION OF THE DRAWINGS

The features of the present invention will best be understood from a detailed description of the invention and example embodiments thereof selected for the purposes of illustration and shown in the accompanying drawings in which.

1.6 ITEM NUMBER LIST

Figure 1:
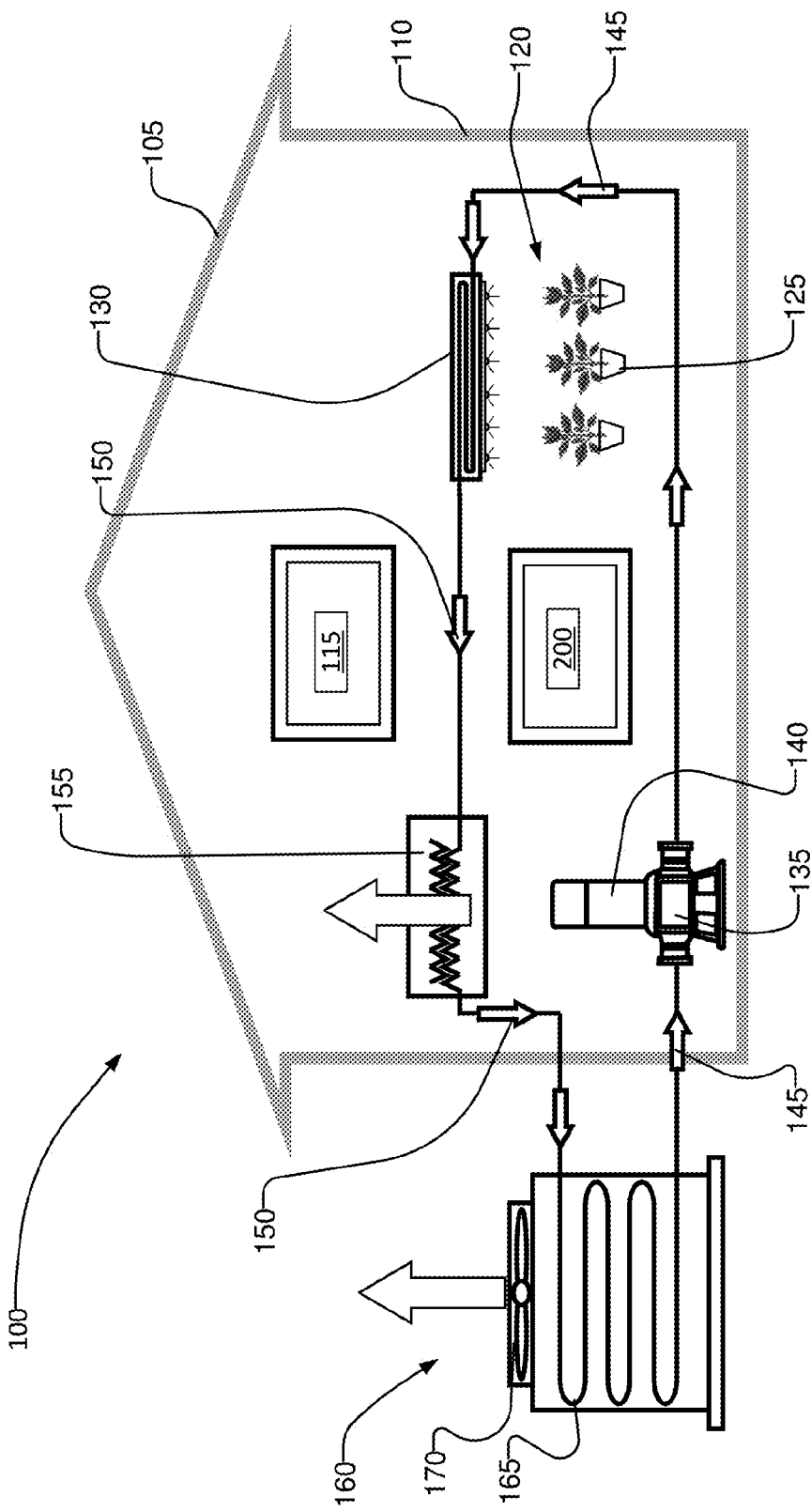
FIG. 1 depicts a non-limiting exemplary schematic diagram of a plant cultivation system that includes a liquid cooled LED irradiation system according to the present invention.

The following item numbers are used throughout, unless specifically indicated otherwise.

| # | DESCRIPTION |
|---|---|
| 100 | Plant cultivation system |
| 105 | Roof |
| 110 | Walls |
| 115 | Climate control |
| 120 | Horticultural products |
| 125 | Containers |
| 130 | Lighting assembly |
| 135 | Pump |
| 140 | Cooling fluid reservoir |
| 145 | Cold side liquid conduit |
| 150 | Hot side liquid conduit |
| 155 | First heat exchanger |
| 160 | Second heat exchanger |
| 165 | Cooling coil |
| 170 | Fan |
| 200 | Electronic controller |
| 205 | Data processor |
| 210 | Memory module |
| 215 | 1$^{st}$ Network interface device |
| 220 | 2$^{nd}$ Network interface device |
| 225 | Power input port |
| 230 | Communication ports |
| 235 | Lighting assembly port |
| 240 | External power source |
| 250 | Power conditioning and distribution module |
| 255 | Battery |
| 260 | Sensors |
| 265 | User interface |
| 300 | Lighting assembly |
| 310 | Light support beam |
| 315 | Light support beam |
| 320 | Light support beam |
| 325 | Light support beam |
| 330 | Transverse end beam |
| 335 | Transverse end beam |
| 340 | DC power source module |
| 345 | DC power source module |
| 350 | End cap |
| 355 | Coordinate axes |
| 400 | U-shaped cross-section |
| 405 | Base wall |
| 410 | Side wall |
| 415 | Side wall |
| 420 | Lamp cavity |
| 425 | Lighting module |
| 430 | Support structure |
| 435 | LED lamp |
| 440 | Reflector surface |
| 445 | Reflector surface |
| 450 | Lamp cavity cover |
| 455 | Annular wall |

-continued

| # | DESCRIPTION |
|---|---|
| 460 | Fluid conduit |
| 465 | Reflective base surface |
| 470 | Top surface |
| 475 | Bottom surface |
| 480 | Circular pipe |
| 485 | Rectangular pipe |
| 490 | Thermally conductive layer |
| 495 | Electrically insulating layer |
| 497 | Mounting pad |
| 498 | Thermally insulating layer |
| 500 | Cooling flow diagram |
| 505 | Cold side liquid conduit |
| 510 | Hot side liquid conduit |
| 515 | Transverse conduit |
| 520 | Transverse conduit |
| 525 | Transverse conduit |
| 530 | Longitudinal conduit |
| 535 | Longitudinal conduit |
| 540 | Longitudinal conduit |
| 545 | Longitudinal conduit |
| 550 | Input connecting conduit |
| 555 | Output connecting conduit |
| 600 | LED illumination system |
| 605 | LED lamp assembly |
| 610 | LED lamp assembly |
| 615 | LED lamp assembly |
| 620 | LED lamp assembly |
| 625 | Lamp power module |
| 630 | LED unit panel |
| 635 | LED lamp |
| 640 | Support structure |
| 645 | Power bus |
| 650 | DC power source |
| 700 | Wiring diagram |
| 705 | Output terminal |
| 710 | Red Power source |
| 715 | Red conductive trace |
| 720 | Jumper |
| 725 | Jumper |
| 730 | Jumper |
| 735 | Negative terminal |
| 740 | White power source |
| 745 | Positive terminal |
| 750 | Negative terminal |
| 755 | White conductive trace |
| 760 | Deep red power source |
| 765 | Positive terminal |
| 770 | Negative terminal |
| 775 | Deep red conductive trace |
| 780 | Blue power source |
| 785 | Positive terminal |
| 790 | Negative terminal |
| 795 | Blue conductive trace |
| 800 | Graphical comparison |
| 805 | First curve |
| 810 | Second curve |
| 815 | Third curve |
| 820 | Forth curve |
| 830 | Three minor spectral peaks |
| 835 | Tail of main spectral peak |
| 905 | Chlorophyll A |
| 910 | Chlorophyll B |
| 915 | Carotenoids |

DESCRIPTION OF SOME EMBODIMENTS OF THE INVENTION 1.6.1 System Overview

Referring now to FIG. 1, a non-limiting exemplary plant cultivation system (100) according to the present invention is operable to irradiate various horticultural products with artificial light. The plant cultivation system (100) is installed inside a structure that at least includes a roof (105) and may also include side walls (110). A climate control system (115) is optionally provided to control temperature, humidity, ventilation or the like within the structure as required to provide an appropriate environment for the various horticultural products.

The various horticultural products (120) are supported in a manner suitable for cultivation, which may vary widely depending on the type of horticultural products (120) and the stage of plant development. In one non-limiting embodiment, the horticultural products (120) are planted in soil beds and or in soil filled containers (125). In other non-limiting embodiment the horticultural products (120) are grown without soil in hydroponic beds and or containers (125) that are configured to irrigate the horticultural products with a suitable static or flowing nutrient rich liquid solution. In one non-limiting example embodiment the soil or liquid filled containers (125) are horizontally disposed over a two dimensional area, e.g. resting directly on a floor surface or resting on a raised horizontal surface such as a table or a horizontal shelf structure, not shown.

At least one lighting assembly (130) is disposed above the two dimensional horizontal horticultural products support area and the lighting assembly (130) is configured to irradiate the horticultural products (120) from above the two dimensional horizontal horticultural products support area. Accordingly, the size and shape of the lighting assembly (130) is substantially matched to the two dimensional horizontal horticultural support area and the lighting assembly positioned over the two dimensional horticultural support area in a manner that allows the lighting assembly (130) to substantially uniformly illuminate the entire two dimensional horizontal horticultural products support area.

As will be recognized, other horticultural product support arrangements and corresponding lighting assembly configurations are usable without deviating from the present invention as long as the lighting assembly (130) is disposed in a position with respect to the two dimensional horizontal horticultural products support area and configured with appropriate length and width dimensions to substantially uniformly illuminate the entire area supporting horticultural products. In one non-limiting exemplary embodiment a single lighting assembly (130) is configured with length and width dimensions that are substantially matched with length and wide dimensions of the horizontal horticultural products support area. In another non-limiting exemplary two or more lighting assemblies (130) each having the same length and the same width dimension are installed above horizontal horticultural products support area such that an overall length and an overall width dimension of the two or more lighting assemblies is matched to the length and wide dimensions of the horizontal horticultural products support area. As will be further recognized by those skilled in the art, various three dimensional horticultural products support areas are usable with one or more lighting assemblies (130) positioned to illuminate the horticultural products without deviating from the present invention.

The plant cultivation system (100) includes a liquid cooling system operable to continuously or intermittently cool the lighting assembly (130). The liquid cooling system includes a pump (135) and an associated cooling fluid reservoir (140) for circulating and storing a cooling fluid. The cooling fluid may comprise water, deionized water, inhibited glycol and water solution, or a dielectric fluid such as polyalphaolefin which is a metallized water solution, or any other suitable cooling fluid.

The liquid cooling system includes an input or cold side liquid conduit (145) that extends from the pump (135) to the lighting assembly (130). As will be further described below, the cooling fluid enters cooling fluid conduits that extend through the lighting assembly (130) and the cooling fluid exits from the cooling fluid conduits that extend through the lighting assembly (130) to an output or hot side liquid conduit (150). The hot side liquid conduit (150) extends from the lighting assembly (130) to a first heat exchanger (155). In one non-limiting exemplary embodiment the first heat exchanger (155) is a liquid to gas heat exchanger usable to heat room air by an exchange of thermal energy between the warmer cooling fluid with the cooler room air or other gas as may be desirable. In this case the first heat exchanger (155) includes a fan, not shown, operable to direct a flow of room air over the liquid to gas heat exchanger element to exchange thermal energy between the warm cooling fluid and the room air. In another non-limiting exemplary embodiment, the first heat exchanger (155) is a liquid to liquid heat exchanger usable to heat another liquid by an exchange of thermal energy between the warmer cooling fluid with the second liquid which is cooler than the cooling fluid. In this case the second liquid may comprise the static or flowing nutrient rich liquid solution usable to irrigate the plant containers or hydroponic beds (125) or the second liquid may be otherwise utilized after heating, e.g. to warm the room air.

The hot side liquid conduit (150) further extends from the first heat exchanger (155) to a second heat exchanger (160) which may be disposed inside or outside the structure. The cold side liquid conduit (145) further extends from the second heat exchanger (160) to the pump (135). In one non-limiting example embodiment, second heat exchanger (160) comprises a cooling coil (165), or the like, and an air moving device, such as a fan (170). The second heat exchanger (160) provides sufficient cooling capacity to extract enough thermal energy from the cooling fluid to render the cooling fluid ready to cool the lighting assembly (130). In particular if a desired operating temperature of the lighting assembly (130) is not to exceed 140° F. or 60° C., the cooling fluid exiting the second heat exchanger (160) would preferably have a temperature of less than about 125° F. or 52° C.

As will be recognized by those skilled in the art the cooling capacity and rate of cooling of the second heat exchanger (160) depends on the surface area of the cooling coil (165), the temperature gradient between the ambient air being flowed over the cooling coil (165) by the fan (170) and the flow rate of both the cooling fluid, e.g. in liters per minute, and the flow rate of the air being flowed over the cooling coil (165), e.g. cubic centimeters per minute. As will be further recognized the flow rate of the cooling fluid can be varied by altering the fluid flow rate of the pump (135) and the flow rate of the ambient air can be varied by altering the fluid flow rate of the fan (170). Similarly, the cooling capacity and rate of cooling of the cooling fluid usable to cool the lighting assembly (130) depends on the surface area of the cooling conduits passing through the lighting assembly, described below, the temperature gradient between the cooling fluid and the surfaces being cooled by the cooling fluid and the volume flow rate of the cooling fluid, e.g. in liters per minute, being pumped through the lighting assembly (130).

The liquid cooling system further includes various control and sensor elements, not shown. The control elements include various valves, flow restrictors, or the like, usable to change the flow configuration, e.g. to bypass the first heat exchanger (155) to use only the second heat exchanger (160); or, to bypass the second heat exchanger (160) to use only the first heat exchanger (155). The control elements may be operated manually or may be electrically or pneumatically actuated under the control of an electronic controller (200) shown in FIG. 2. Additionally the cooling system includes various sensors, not shown, operable to sense temperature, e.g. indoor and outdoor air temperature, temperature of one or more regions of the lighting assembly (130) and temperature of the cooling fluid and or temperature of the conduits carrying the cooling fluid such in one or both of the heat exchangers (155) and (160), on the cold side liquid conduit (145) and or in the hot side liquid conduit (150). Other sensors may also be provided in communication with the electronic controller (200) to sense cooling fluid pressure and flow rate and or air pressure and flow rate proximate to either of the heat exchangers.

1.6.2 Electronic Controller

Figure 2:
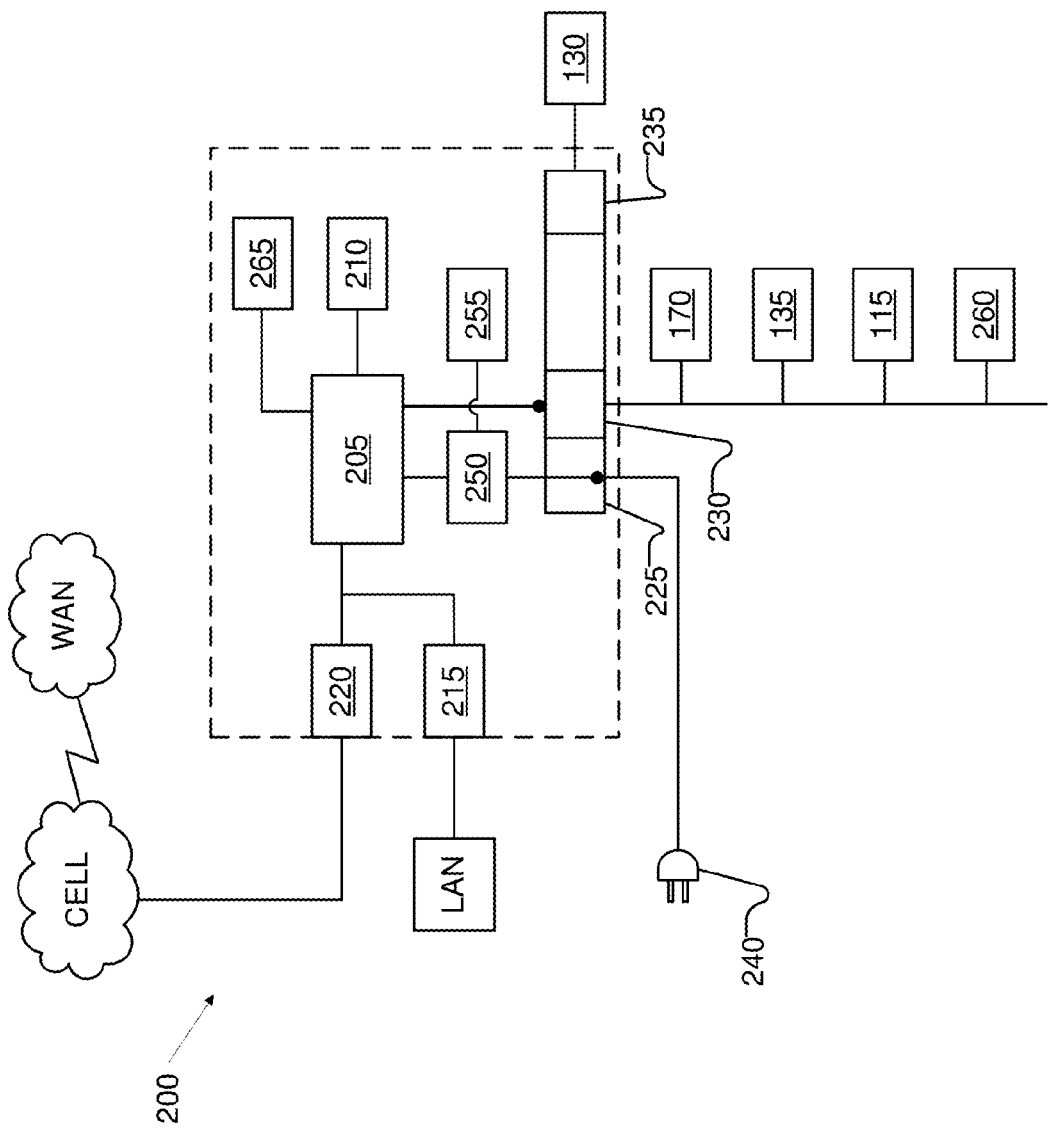
FIG. 2 depicts a non-limiting exemplary schematic diagram of an electronic controller for operating a liquid cooled LED irradiation system according to the present invention.

Referring now to FIGS. 1 and 2, in a non-limiting exemplary embodiment, the plant cultivation system (100) further includes an electronic controller (200). The electronic controller (200) includes a digital data processor (205), or other logic controller, a digital memory module (210) in communication with the digital data processor (205), and one or more wireless and or wired network interface devices (215) and (220) each in communication with the digital data processor (205) and a user interface device (265) in communication with the data processor (205). The data processor (205) runs an operating program that performs various logical operations in order to provide basic command and control functions such as communicating with other electronic devices, power distribution, storing data on and retrieving data from the memory module (210), responding to user commands received from the user interface device (265) and operating the user interface device to display or otherwise convey useful information to a user.

In one non-limiting example embodiment, the electronic controller (200) includes a first network interface device (215) such as a wired network interface device operating as an Ethernet network interface device using the IEEE 802.3 protocol, or the like. Additionally the electronic controller (200) includes a second network interface device (220) operating as a wireless networking interface device such as a cellular network interface device using any one of the GSM, 3G, LTE, 4G cellular network interface protocols, or such as a Wi-Fi network interface device using the IEEE 802.11 network interface protocol or the like. Each of the first network interface device (215) and the second network interface (220) is in communication with the data processor (205). Alternately one or both of the network interface devices can be incorporated within the data processor (205).

The electronic controller (200) further includes Input Output (I/O) interface elements that at least includes a power input port (225) and may include a plurality of serial or parallel communication ports (230), e.g. Universal Serial Bus (USB) ports, or the like, and a lighting assembly interface port (235) for interfacing with the lighting assembly (130). Each of the ports (230) and (235) includes a communication interface with the data processor (205). The power input port (225) interfaces with an external power source (240) such as grid power. A power conditioning and distribution module (250) receives input power from the power source (240) and conditions and distributes the power to various modules of the electronic controller (200). A battery (255) or other energy storage element is also provided to at least power the electronic controller (200) when grid power is unavailable. Additionally the power conditioning and distribution module (250) may interface with each of the fan (170), the pump (135), the lighting assembly (130) and any sensors (260) operating on the plant cultivation system (100).

The communication ports (230) are interfaced with the data processor (205) and with a plurality of other electrical devices of the plant cultivation system (100) such as the fan (170), the pump (135), the lighting assembly (130) and any sensors (260) operating on the plant cultivation system (100). Accordingly the communication ports (230) allow the data processor (205) to receive data and status information from the other electronic devices that are being controlled by the data processor (205) and to send command and control information and or data to the other electrical devices as required to operate the plant cultivation system (100). In an alternate non-limiting embodiment, any one of or all of the other electrical devices of the plant cultivation system (100) such as the fan (170), the pump (135), the lighting assembly (130) and any sensors (260) operating on the plant cultivation system (100) as well as the climate control system (115) may be reachable over a wired or wireless network using one or both of the first and second network interface devices (215) and (220). Thus in some embodiments elements such as the fan (170), the pump (135), the lighting assembly (130) and sensors (260) include a network interface device operating thereon such that communication with the data processor (205) is over one or both or the first network interface device (215) and the second network interface device (220) instead of or in addition to being reachable over the communication ports (230) or over the lighting assembly port (235). Thus in various embodiments command and control information and or data is exchanged between electrical devices connect to the electronic controller (200) over a network using network packets.

1.6.3 Lighting Assembly Unit

Figure 3:
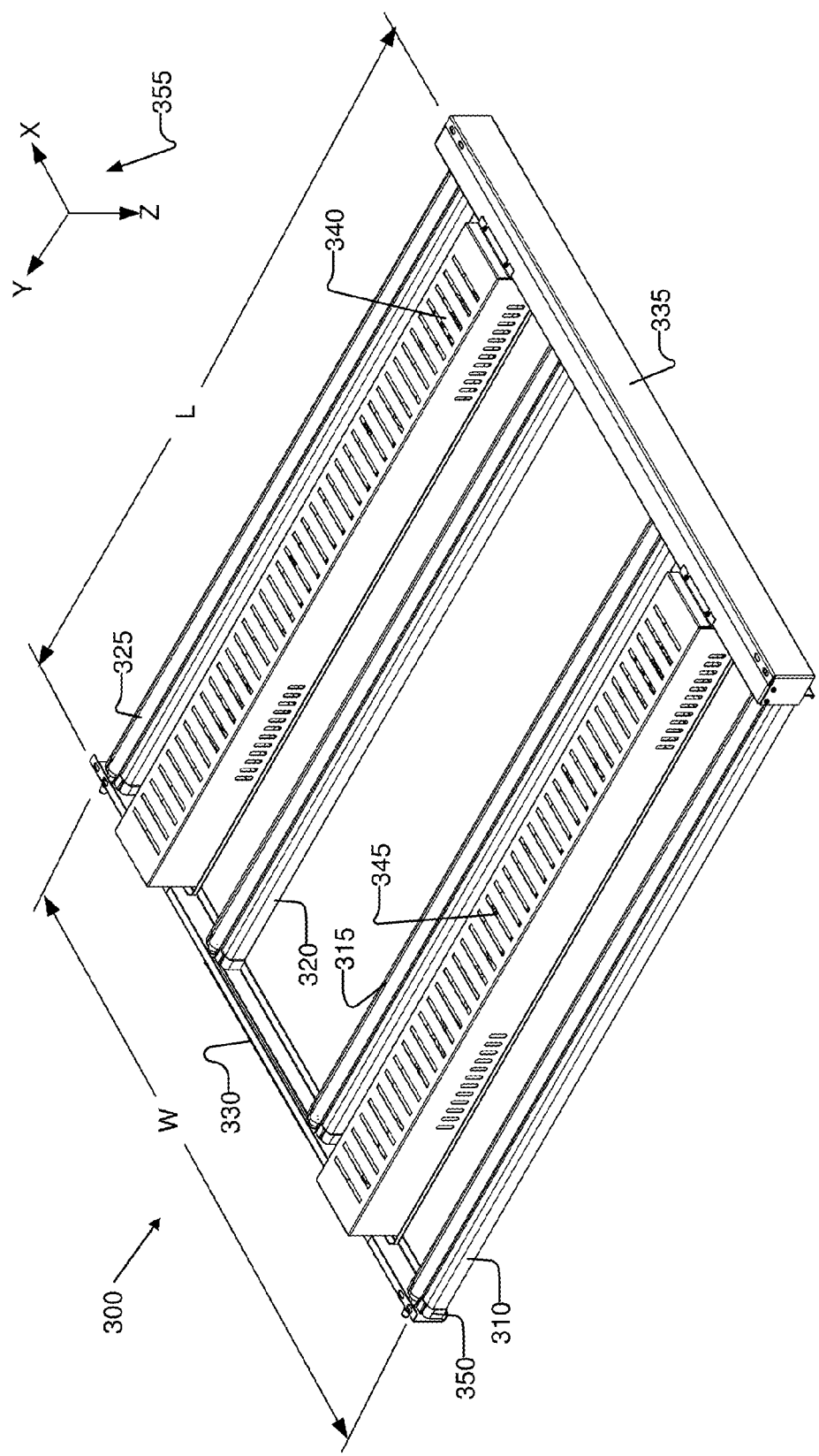
FIG. 3 depicts a non-limiting exemplary top isometric view of an LED lighting assembly according to the present invention.

Referring now to FIG. 3 a top isometric view of a non-limiting exemplary lighting assembly (300) according to the present invention includes four light support beams (310) (315) (320) (325), two transverse end beams (330) and (335) and two DC power source modules (340) and (345). Each of the four light support beams (310) (315) (320) (325) is substantially identical having a longitudinal dimension (L) extending along a longitudinal axis (Y). Each of the two transverse end beams (330) (335) is has a transverse dimension (W) extending along a transverse axis (X). Each of the four light support beams (310) (315) (320) (325) is fixedly attached to a first transverse end beam (335) at a first end thereof and fixedly attached to a second transverse end beam (330) at a second end thereof. The four light support beams (310) (315) (320) (325) are formed from an aluminum alloy or from another metal alloy having a coefficient of thermal conductivity preferably ranging from about 200 to 250 W/m° K. Other metals such as alloys comprising copper, silver and gold are usable to increase the coefficient of thermal conductivity up to about 300 W/m° K are usable without deviating from the present invention but at greatly increased cost. Each of the two transverse end beams (330) (335) preferably comprise aluminum; however the end beams can be fabricated from materials having lower coefficients of thermal conductivity such as steel.

The four light support beams (310) (315) (320) (325) are joined together with the two transverse end beams (330) (335) by mechanical fasteners to form a substantially rigid frame that can be suspended above the two dimensional horizontal horticultural support area, described above, and positioned in a manner that allows the lighting assembly (300) to substantially uniformly illuminate the entire two dimensional horizontal horticultural products support area. In one non-limiting example embodiment the lighting assembly (300) is suspended from above such as hung from the roof (105). Alternately the lighting assembly (300) is supported from below such as by legs or other support members, not shown, with the support members disposed between the floor and at least two of the four light support beams or at least two of the two transverse end beams (330) (335). Alternately the lighting assembly (300) is suspended from a wall (110) or any combination of suspended from the roof and the wall and supported from the floor. Additionally lighting assemblies (300) can be mechanically interfaced to operate in cooperation with other structures including plant racks, plant containers, vehicles, storage containers, or the like.

Each of the four light support beams (310) (315) (320) (325) includes a first end cap (350) disposed between a second end of the light support beam (310) and the second transverse end beam (330). A second substantially identical end cap, not shown, is disposed between an opposing first end of the light support beam (310) and the first transverse end beam (335). For each of the four support beams (310) (315) (320) (325) an end cap (350) is fixedly attached to each end thereof. As will be further detailed below, each of the four light support beams (310) (315) (320) (325) is substantially identical and each light support beam comprises an extruded U-shaped aluminum channel comprising by a base wall and two opposing sidewalls.

Generally the lighting assembly (300) may be formed using a single light support beam (325) and a single DC power source module (340) and the light support beam (325) can have any practical longitudinal length (L). Otherwise it is more economical to configure the lighting assembly (300) with pairs of light support beam (325) and (320) supporting a single DC power source module (340). More generally any practical number of pairs of light support beam (325) and (320) each supporting a single DC power source module (340) or (345) is usable. The longitudinal length (L) is selected to match the length of the number of repeating LED unit panels, described below, that will be supported by the light support beams. However standard longitudinal lengths (L) of 24, 36, 48 and 96 inches (0.6. 0.9, 1.2 and 2.4 meters) are preferred.

1.6.4 Light Support Beams

Referring now to FIG. 4A, in a first non-limiting exemplary embodiment of the present invention each of the light support beams (310) (315) (320) (325) is formed with a U-shaped cross-section (400). More specifically FIG. 4A depicts a transverse cross-section of any one of the light support beams (310) (315) (320) (325) in the X-Z plane (see coordinate axes (355) in FIG. 3). The U-shaped cross-section (400) includes a base wall (405) and two opposing sidewalls (410) and (415). Each of the side walls (410) and (415) extend substantially orthogonally from a corresponding left and right edge of the base wall (405). The base wall (405) and each of the side walls (410) and (415) form three sides of a lamp cavity (420). The lamp cavity (420) has a rectangular cross-section that extends along the entire longitudinal length (L) of each of the light support beams (310) (315) (320) (325). Other lamp cavity cross-sections are usable, e.g. square, and trapezoidal, without deviating from the present invention. The lamp cavity (420) is provided to house one or more LED lighting modules (425) attached to an inside surface of the base wall (405).

An LED lighting module (425), shown in cross-section, includes a support structure (430) for supporting a plurality of LED lamps (435) thereon. The support structure (430) is attached to an inside surface of the base wall (405) inside the lamp cavity (420). LED lamps (435) are each supported by the support structure (430) and are oriented to direct radiation emitted by each LED lamps (435) out of the lamp cavity (420). The support structure (430), further described below, provides an electrical and mechanical interface for powering and supporting each LED lamp (435).

The lamp cavity (420) further includes two reflective surfaces (440) and (445). Each reflective surface is disposed to provide a trapezoidal shaped light box configured to reflect radiation emitted by each LED lamp (435) out of the lamp cavity (420). As such that lamp cavity has a light emitting cone angle defined by the reflective surfaces (440) and (445) which can be configured to direct light exiting from the lamp cavity (420) toward the two dimensional horizontal horticultural support area positioned below the lighting assembly (300). The reflective surfaces (440) and (445) may also extend across a reflective base surface (465) including between the LED lamps (435). The reflective surfaces (440) and (445) may be specular reflective surfaces or diffuse reflector surfaces. Each of the two reflective surfaces (440) and (445) extends along the entire longitudinal length (L) of the light support beam inside the lamp cavity (420). Each reflective surface may be provided by applying a reflective layer onto a support element. One example includes a thin film adhesive backed reflective tape or film available from the Scotchlite™ division of 3M™. The support element used to support the reflective tape or other mirrored surface may be formed by one or more bent sheet metal elements or by a molded or otherwise formed plastic element, or the like. The support elements used to support the reflective tape or other mirrored surface may be a single element formed to provide both reflective surfaces (440) and (445) and the reflective base surface (465) along the entire longitudinal length (L) or the support element may be two or more elements each formed to provide one of reflective surfaces (440) and (445) and the reflective base surface (465).

The lamp cavity (420) includes a transparent or translucent lamp cavity cover (450). The lamp cavity cover (450) is installed to moisture seal the lamp cavity (420) and to protect the support structure (430) and the LED lamps (435) mounted inside the lamp cavity (420) from mechanical damage. A separate lamp cavity cover (450) extends along the entire longitudinal length (L) of each light support beam (310) (315) (320) (325) and interfaces with an end cap (350) at each end of the light support beams. The lamp cavity cover (450) is sealedly interfaced with each of the side walls (410) and (415) along the entire longitudinal length (L) of light support beam and is further sealedly interfaced with each of the end caps (350) in order to substantially moisture and gas seal the lamp cavity (420) as well as protect elements inside the lamp cavity from mechanical damage. The lamp cavity cover (450) preferably comprises an impact resistant plastic, e.g. polycarbonate, or comprises a structural glass, with suitable optical qualities. The lamp cavity cover (450) is a rectangular element having opposing and substantially parallel top (470) and bottom (475) surfaces such that any light emitted by the LED lamps (435) passes through both the top surface (470) and the bottom surface (475) of the lamp cavity cover (450) as it exits the lamp cavity (420). In one non-limiting example embodiment, the lamp cavity cover is substantially uniformly transparent over the useful spectral power range of the LED's such as from 350 to 750 nm and both the top and bottom surfaces (470), (475) of the lamp cavity cover (450) are anti-reflection coated using a broad spectrum (e.g. 350 to 750 nm) anti-reflection coating layer. In another non-limiting example embodiment, the lamp cavity cover (450) is formed with a semi-transparent or translucent material. Alternately, the lamp cavity cover is substantially uniformly transparent and a semi-transparent or translucent coating layer is formed or otherwise applied onto one or both of the top and bottom surfaces (470), (475). In either case, the semi-transparent or translucent nature of the lamp cavity cover is provided to diffuse radiation as it passes through the lamp cavity cover (450). In still further embodiments, the cavity cover is patterned with transparent regions and semi-transparent or translucent regions as may be desired to define the light emitting cone angle of the lamp cavity (420) or to otherwise form a desired light exiting pattern for light exiting from the lamp cavity (420).

The base wall (405) of the U-shaped cross-section (400) includes an annular wall (455) extending from an outside surface thereof opposed to the lamp cavity (420). The annular wall (455) encloses a circular fluid conduit (460). The annular wall (455) and the fluid conduit (460) extend along the entire longitudinal length (L) of each of the light support beams (310) (315) (320) (325) and the fluid cavity (460) is open at each end of the light support bean in order to interface with other cooling fluid conduits in order to provide a flow of cooling fluid passing through the fluid cavity (460). Additionally each end of the annular wall (455) may extend beyond the ends of the lamp cavity (420) and include or attach to a fluid conduit fitting suitable for interfacing with other cooling fluid conduits.

The fluid conduit (460) is provided to transport the above described liquid cooling fluid there through. As detailed above, the U-shaped cross-section (400) is formed from aluminum and the U-shaped cross-section (400) is preferably formed by extrusion. Moreover since the aluminum has a relatively high coefficient of thermal conductivity preferably ranging from about 200 to 250 W/m° K the U-shaped cross-section (400) readily absorbs thermal energy emitted by the lighting module (425) and rapidly conducts the absorbed thermal energy to all regions of the U-shaped cross-section (400) to rapidly equalize the operating temperature of the U-shaped cross-section (400) over the entire mass of the light support beam. Meanwhile when cooling fluid is pumped through the circular fluid conduit (460) thermal energy is absorbed by the cooling fluid along the full length of the light support beam. As a result, the lighting module (425) is actively cooled by the cooling fluid in order to maintain the LED lamps (435) at a desired operating temperature, e.g. as less than about 140° F. or 60° C. More specifically, each light support beam is configured to thermally conduct thermal energy from each of the LED's (435) through the support structure (430) and through the base wall (405) to the annular wall (455) for transfer to the cooling fluid passing through the conduit (460).

In alternate embodiments shown in FIGS. 4B, and 4C, a circular pipe (480) or a rectangular pipe (485) may be attached to the U-shaped cross-section (400) to provide a circular fluid conduit formed by the circular pipe (480) or a rectangular fluid conduit formed by the rectangular pipe (485). In one non-limiting exemplary embodiment the circular pipe (480) is a circular copper or aluminum pipe attached to an outside surface of the base wall (405) e.g. by pipe clamps, adhesive bonding, soldering, or the like. In another non-limiting exemplary embodiment the rectangular pipe (485) is a rectangular copper or aluminum pipe attached to an outside surface of the base wall (405) e.g. by pipe clamps, adhesive bonding, soldering, or the like. In each case a mechanical interface between the circular pipe (480) or a rectangular pipe (485) provides sufficient mating surface contact area between the pipe and the base wall (405) to provide enough thermal energy conduction from the base wall (405) to the cooling fluid flowing through the corresponding fluid conduit to meet the cooling load.

1.6.5 Cooling Flow Diagram

Referring now to FIGS. 1-5, a top view of a multi-unit lighting assembly is depicted with a schematic cooling fluid flow diagram (500) of a non-limiting exemplary embodiment of the present invention. As shown the multi-unit lighting assembly of FIG. 5 includes three lighting assemblies (300) installed in a desired operating position shown in a top view. Each lighting assembly (300) includes four light support beams assembled with two transverse end beams and two DC power source modules as shown in FIG. 3. Each of the four light support beams includes a longitudinal cooling fluid conduit (530), (535), (540), (545) extending along its longitudinal length as described above and shown in FIG. 4. The cooling fluid flow diagram (500) depicts a cold side liquid conduit (505) in fluid communication with the pump (135) and cooling fluid reservoir (140) shown in FIG. 1. A hot side liquid conduit (510) is in fluid communication with at least one of the first heat exchanger (155) and the second heat exchanger (160) or both.

In the cooling flow diagram (500) each of the lighting assemblies (300) further includes three transverse conduits (515), (520) and (525) arranged to connect each of the four longitudinal cooling fluid conduits (530), (535), (540), (545) in series. Each of the transverse conduits is supported by one of the transverse end beams e.g. (330) and (335) described above and shown in FIG. 3. Each of the transverse conduits (515), (520) and (525) is in fluid communication with two longitudinal fluid conduits. The longitudinal conduit (530) is in fluid communication with the cold side liquid conduit (505) over an input connecting conduit (550). The longitudinal conduit (545) is in fluid communication with the hot side liquid conduit (510) over an output connecting conduit (555).

The cooling fluid flowing into the longitudinal conduit (530) from the cold side liquid conduit (505) flows through the longitudinal conduit (530), across the transverse conduit (515), through the longitudinal conduit (535), across the transverse conduit (520), through the longitudinal conduit (540), across the transverse conduit (525), through the longitudinal conduit (545) and out of the lighting assembly (300) over an output connecting conduit (555). In another non-limiting exemplary embodiment the four longitudinal cooling fluid conduits (530), (535), (540), (545) can be connected in parallel wherein each longitudinal cooling fluid conduit receives the cooling fluid from the cold side liquid conduit (505) and returns cooling fluid to the hot side liquid conduit (510). In a further parallel flow arrangement each pair of two longitudinal cooling fluid conduits e.g. the pair (530), (535), are connected to the cooling fluid system in parallel wherein the longitudinal cooling fluid conduit (530) is connected to and receives cooling fluid from the cold side liquid conduit (505), and the longitudinal cooling fluid conduit (535) is connected to and delivers cooling fluid to the hot side liquid conduit (510).

Other elements of the cooling flow diagram (500), not shown, include one or more fluid control valves disposed along the cold side liquid conduit (505) and the hot side liquid conduit (510) as may be required to operate one lighting assembly or two or more lighting assemblies by opening and closing control valves. Other fluid control elements or sensors, not shown, may include a pressure sensor, flow rate sensor and or temperature sensors disposed to monitor local temperature and fluid flow conditions as may be required to manage the operating mode of the overall cooling system and to maintain a desired operating temperature.

1.6.6 LED System

Figures 6, 6A:
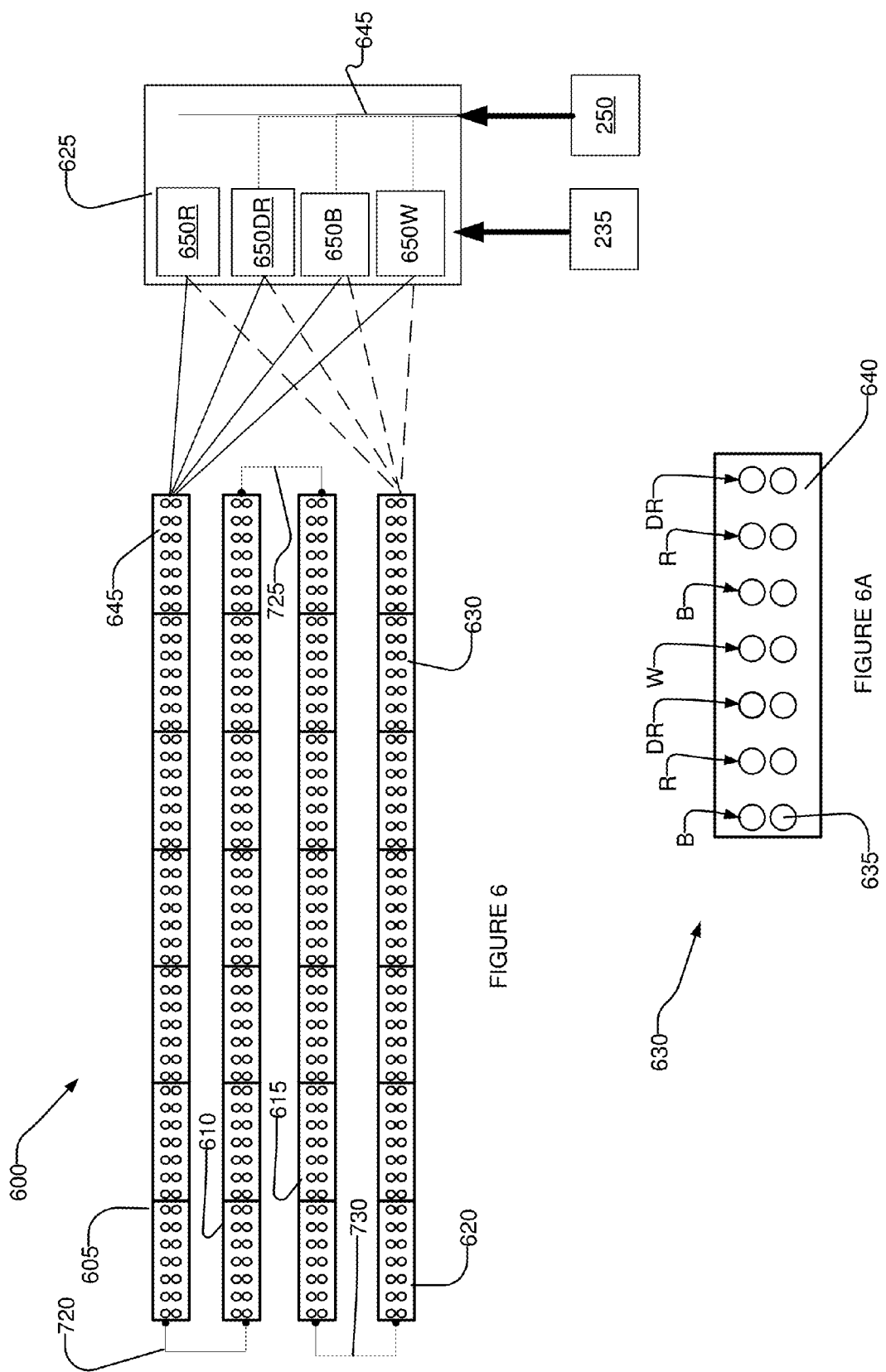
FIG. 6 depicts a non-limiting exemplary bottom schematic view of arrays of LED lamps with each array including different LED types and with each LED type electrically interfaced to a different power supply according to the present invention.
FIG. 6A depicts a non-limiting exemplary bottom schematic view depicting an LED unit panel according to the present invention.

Referring now to FIG. 6 a non-limiting exemplary LED illumination system (600) is shown in a bottom schematic view according to the present invention. The LED illumination system (600) includes four LED lamp assemblies (605), (610), (615) and (620). Each of the four LED lamp assemblies (605), (610), (615) and (620) is directly electrically interfaced with a lamp power module (625) or is indirectly electrically interfaced to the lamp power module (625) through another LED lamp assembly, as is shown in the present example embodiment.

Figure 4:
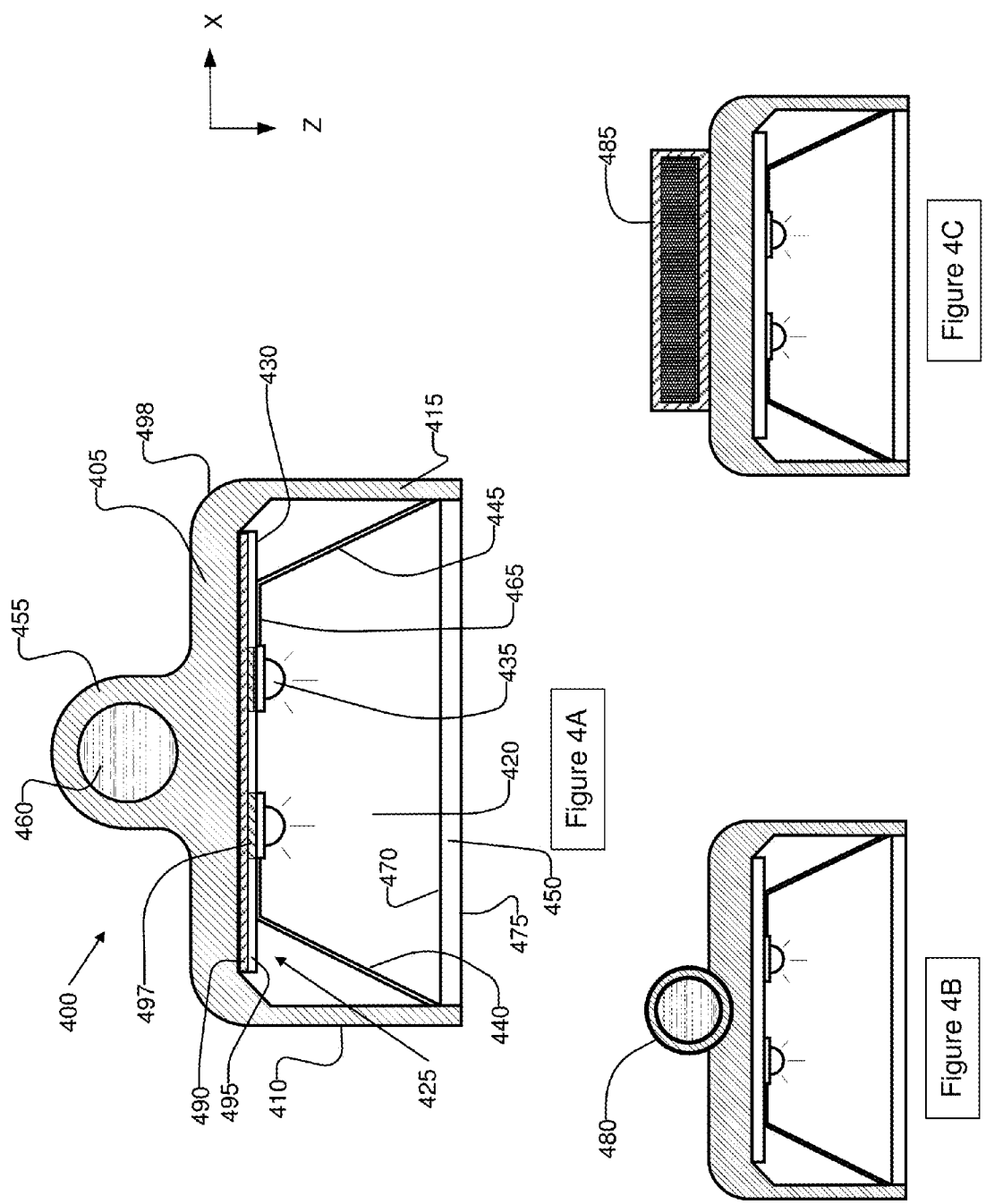
FIG. 4A depicts a non-limiting exemplary transverse section view taken through a first embodiment of a light support beam that includes a liquid conduit formed integral with the light support beam according to the present invention.
FIG. 4B depicts a non-limiting exemplary transverse section view taken through a second embodiment of a light support beam that includes a circular liquid conduit attached to the light support beam according to the present invention.
FIG. 4C depicts a non-limiting exemplary transverse section view taken through a second embodiment of a light support beam that includes a rectangular liquid conduit attached to the light support beam according to the present invention.
Figure 5:
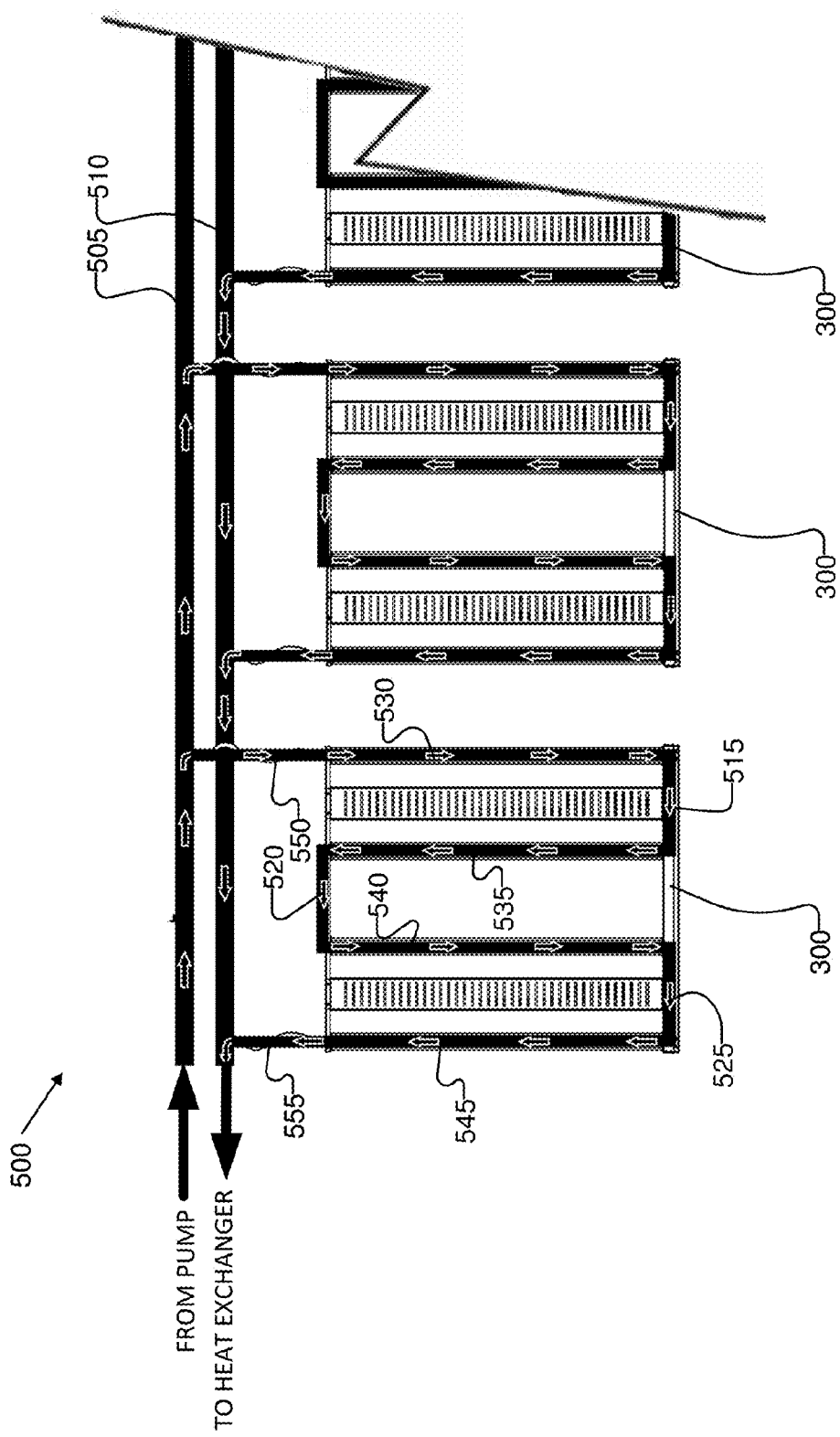
FIG. 5 depicts a non-limiting exemplary top schematic view of a plurality of LED lighting assemblies showing a flow pattern of a liquid cooling fluid passing through each of the plurality of LED lighting assemblies according to the present invention.

Each LED lamp assembly (605), (610), (615) (620) is attached to a different one of the light support beams shown in FIG. 3. For example, the LED lamp assembly (605) is attached to a bottom side of the light support beam (325) shown in FIG. 3 and is attached to the base wall of the U-shaped cross-section (400) inside the lamp cavity (420) of the light support beam (325), as shown in FIG. 4. Likewise each of the other LED lamp assemblies (610), (615) and (620) is mounted onto the base wall of the U-shaped cross-section (400), inside the lamp cavity (420), of one of the other light support beams (315), (320) and (325) respectively. Each of the four LED lamp assemblies (605), (610), (615) and (620) is substantially identical and includes seven LED unit panels (630) with each unit panel (630) being substantially identical.

Referring now to FIG. 6A, each unit panel (630) includes a total of fourteen (14) LED lamps (635) with each LED lamp (635) comprising a light emitting diode mounted onto a support structure (640) such as a printed circuit board (PCB) or the like that includes an electrical power interface to each LED lamp (635) formed thereon. The fourteen LED lamps (635) are arranged in two side by side rows of seven (7) LED's formed as seven side by side pairs of two identical LED lamps (635). The seven pairs of LED lamps include four different LED types wherein each lamp type has a different spectral power output. In the present example embodiments the seven pairs of LED lamps includes a single pair of white LED lamps (W), two pairs of blue LED lamps (B), two pairs of red LED lamps (R) and two pairs of deep red LED lamps (DR) wherein the color of each LED type (W, B, R, DR) relates to a characteristic spectral power emitted by each different LED type. While the seven pairs of LED lamps shown in FIG. 6A is ordered from left to right, blue (B), red (R), deep red (DR), white (W), blue (B), red (R) and deep red (DR) the order of the different LED types can be rearranged without deviating from the present invention, provided that all like LED types can be powered on and off separately from all other like LED types.

While the arrangement of the unit panel (630) is a preferred embodiment, other arrangements for providing lamp assemblies (605), (610), (615) and (620) can be used without deviating from the present invention. In particular the total number of LED lamps (635) used to provide a unit panel, the position of each LED lamp (635) on the unit panel and the combination of LED types and the number of LED lamps per LED type are all variables that can be altered to optimize the spectral power output and spatial irradiance pattern of the lamp assemblies for cultivating a particular horticultural product.

Each unit panel (630) may comprise an individual module e.g. having its own support structure (640) and having an identical LED lamp arrangement such that each unit panel (630) is interchangeable with any other unit panel (630). Individual unit panels have an advantage that each unit panel (630) is independently removable from its support beam and can be replaced by another unit panel in the event that one or more LED lamps of a given unit panel fails or becomes damaged. Alternately, each of the lamp assemblies (605), (610), (615) and (620) is formable using a single support structure (640) that extends along the full length of its corresponding support beam without deviating from the present invention.

Thus the exemplary LED illumination system (600) includes four LED lamp assemblies (605), (610), (615) with each LED lamp assembly including seven unit panels (605) with each lamp assembly having ninety eight (98) LED lamps (635) with the four LED lamp assemblies including a total of three hundred and ninety two (392) LED lamps (635).

Referring now to FIGS. 1, 2 and 6, according to a non-limiting exemplary embodiment of the present invention, each like LED lamp type is electrically interfaced with a dedicated DC power source. In particular the lamp power module (625) includes four separately controllable DC power sources with a first DC power source (650R) provided to separately power only red LED lamps (R), a second DC power source (650DR) provided to separately power only deep red LED lamps (DR), a third DC power source (650B) provided to separately power only blue LED lamps (B) and a fourth DC power source (650W) provided to separately power only white LED lamps (W). Each DC power source is electrically interfaced with the power conditioning and distribution module (250) which receives AC grid power and converts the AC grid power to an appropriate DC voltage and current amplitude and distributes the converted power to various devices including each of the LED lamp DC power sources (650R), (650DR), (650B) and (650W). Alternately, AC grid power may be distributed to each of the LED lamp DC power sources (650R), (650DR), (650B) and (650W) and each DC power source includes an AC to DC power converter operating thereon to convert AC grid power to DC power usable to drive LED radiant power output. In addition each LED lamp power source (650R), (650DR), (650B) and (650W) is electrically interfaced to the data processor (205) over the lighting assembly port (235) and is controllable to separately modulate radiant power output to each different LED type over a radiant power amplitude range of substantially zero radiant power to a maximum radiant amplitude of the LED lamps being powered.

As will be further recognized by those skilled in the art, the power conditioning and distribution module (250) may comprise an AC to DC power converter operable with a linear power regulator, or the like, to output substantially constant DC power amplitude at a substantially constant DC voltage to a DC power bus (645). In this case, each of the DC power sources (650R), (650DR), (650B) and (650W) is connected to a DC power bus (645) with each power source having the same DC voltage and power amplitude at a power input side. Thus in one non-limiting example embodiment, each DC power source (650R), (650DR), (650B) and (650W) comprises a switching power supply using digital pulse width modulation to drive each DC power source to generated a desired DC power output and the desired power output is based on individual control signals each by a different one of the DC power supplies from the digital data processor (205) over the lighting assembly port (235) such that the DC power output of each DC power supply (650R), (650DR), (650B) and (650W) separately controlled. Alternately each of the DC power sources (650R), (650DR), (650B) and (650W) may comprise any type of current modulator controllable by the data processor (205) to drive the DC power source at a desired DC power output. Generally the DC power output of each DC power source is controllable over an amplitude range of substantially zero power output and 100% of a desired maximum power output wherein the DC power output range correlates with desired radiant amplitude output of the LED lamps being powered thereby.

In particular every red LED (R) in the LED illumination system (600) is electrically interfaced to the red power source (650R) and the data processor (205) is operable to modulate the electrical power amplitude being output by the red power source (650R) over a substantially linear range. Since the electrical power amplitude output by the red power source (650R) drives the radiant power output of each of the red LED's (R), the electrical power amplitude is modulated in a manner that drives each red LED (R) to provide a desired radiant power output that ranges between one hundred percent or a maximum radiant power output and a substantially zero radiant power output or to output selected radiant power output levels between zero and maximum radiant power output of the red LED's (R).

The arrangement is the same for the other LED types wherein every deep red LED (DR) in the LED illumination system (600) is electrically interfaced to the deep red power source (650DR), every blue LED (B) in the LED illumination system (600) is electrically interfaced to the blue power source (650B) and every white LED (W) in the LED illumination system (600) is electrically interfaced to the white power source (650W). Thus according to the present invention, the data processor (205) can be operated to separately modulate the electrical output power amplitude each power source (650R), (650DR), (650B) and (650W). As a result all of the LED lamps of a particular type can be collectively operated at a selected radiant power amplitude ranging from substantially zero to 100% of a desired maximum radiant power amplitude of a given LED lamp type.

Figure 7:
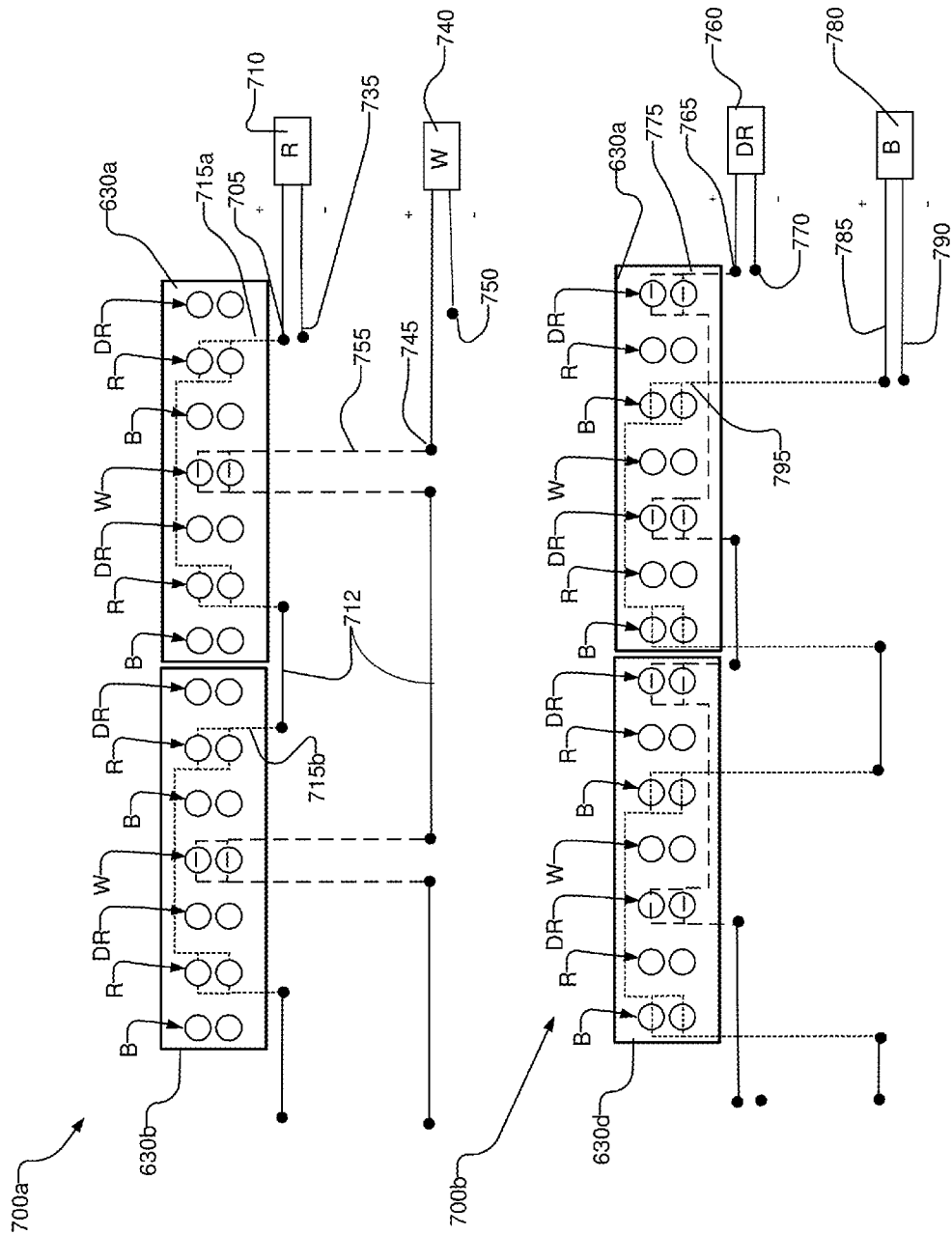
FIG. 7 depicts a non-limiting exemplary bottom schematic view of a plurality of LED unit panels and a non-limiting exemplary wiring diagram for connecting each LED type to a different DC power source.

Referring now to FIGS. 6 and 7, a non-limiting exemplary schematic diagram shows how each LED lamp is serially connected to its corresponding power source (650R), (650DR), (650B) or (650W). A first example wiring diagram (700a) includes two LED unit panels (630a) and (630b) connected in series. A positive power output terminal (705) of the red power source (710) is connected in series to each red LED lamp (R) mounted on the two LED unit panels (630a) and (630b). A red conductive trace (715) associated with red LED lamps (R) is provided on each LED unit panel. The red conductive trace (715) is connected to the positive power terminal (705) and connects with each red LED of a first pair of red LED's (R) and then connects with each red LED of a second pair of red LED's (R) where both pairs being mounted on the first LED unit panel (630a). A red conductive trace (715) is also formed on the second LED unit panel (630b) and connects with each red LED of a first pair of red LED's (R) mounted on the second LED unit panel (630b) and then connects with each red LED of a second pair of red LED's (R) mounted on the second LED unit panels (630b). The red conductive trace (715) may comprise a metalized trace formed onto an exposed surface of the support structure (640) used to support the LED lamps thereon, or the red conductive trance (715) may be formed entirely or partially onto internal layer surfaces of the support structure (640). When each of the LED lamp assemblies comprises a single support structure (640) the red conductive trace (715) connect all of the red LED lamps (R) in series with the positive terminal (705). When each of the LED lamp assemblies (605), (610), (615) or (620) is formed by a plurality of substrate support structures (640), e.g. unit panels (630a) and (630b), the red conductive traces of each individual unit panel are electrically interconnected in series by one or more together by jumpers (712) at breaks between adjacent substrate support structures (640).

In a similar manner each of the other LED lamp assemblies (610), (615) or (620) includes a red conductive trace (715) and in some cases jumpers (712) to electrically interconnect all of the red LED lamps (R) in series. To electrically interconnect all of the red LED lamps (R) mounted on all of four LED lamp assemblies (605), (610), (615) and (620) the red conductive traces (715) of each LED lamp assembly are connected in series by additional jumpers (720), (725) and (730). At the exit of the fourth LED lamp assembly (620) the red conductive trace (715) connects with a negative terminal (735) of the red power source (710) such as by a jumper, or the like.

Similarly a white power source (740) includes a positive power terminal (745) and a negative power terminal (750). The positive power terminal (745) of the white power source (740) is serially connected to each white LED lamp (W) mounted on the two LED unit panels (630a) and (630b) by a white conductive trace (755). As described above as related to the red conductive trace, each unit panel (630a) and (630b) includes a white conductive trace (755) that electrically interconnects each of the white LED's (W) mounted on the LED unit panel (630) in series. Similarly as described above, the white conductive trace (755) in combination with jumpers (712), (720) (725) and (730) interconnect the white conductive traces (755) in order to electrically interconnect all of the white LED's (W) mounted on the LED illumination system (600) in series between the positive terminal (745) and the negative terminal (750) of the white power source (740).

As is further shown in an example wiring diagram (700b), a deep red power source (760) includes a positive power terminal (765) and a negative power terminal (770). The positive power terminal (765) of the deep red power source (760) is connected in series to each deep LED lamp (DR) mounted on the two LED unit panels (630a) and (630b) by a deep red conductive trace (775). As described above as related to the red and white conductive traces, each unit panel (630a) and (630b) includes a deep red conductive trace (775) that electrically interconnects each of the deep red LED's (DR) mounted on the first LED unit panel (630a) in series. Similarly as described above, the deep red conductive trace (775) in combination with jumpers (712), (720) (725) and (730) interconnect the deep red conductive traces (775) in order to electrically interconnect all of the deep red LED's (DR) in the LED illumination system (600) in series between the positive terminal (765) and the negative terminal (770) of the deep red power source (760).

As is further shown in the example wiring diagram (700b), a blue power source (780) includes a positive power terminal (785) and a negative power terminal (790). The positive power terminal (785) of the blue power source (780) is connected in series to each blue LED lamp (B) mounted on the two LED unit panels (630a) and (630b) by a blue conductive trace (795) extends from the positive power terminal (785) to the first LED unit panel (630a) and the trace (795). As described above as related to the red, white and deep red conductive traces, each unit panel (630a) and (630b) includes a blue conductive trace (795) that electrically interconnects each of the blue LED's (B) mounted on the first LED unit panel (630a) in series. Similarly as described above, the blue conductive trace (795) in combination with jumpers (712), (720) (725) and (730) extends to every blue LED (B) in the LED illumination system (600) in series between the positive terminal (785) and the negative terminal (790) of the blue power source (780).

In an alternate electrical connecting scheme each of the LED lamp assemblies (605), (610), (615) and (620) is connected in parallel with the four power sources (650R), (650DR), (650B) and (650W). In particular, refereeing to FIG. 6, the traces (720), (725) and (730) are not present. Instead, all four LED lamp assemblies (605), (610), (615) and (620) are directly connected to positive and negative terminal of each all four power sources (650R), (650DR), (650B) and (650W). More specifically for each lamp assembly, all of the red LED's are connected in series between the positive and negative terminals of the red power source (650R). Similarly for each lamp assembly the deep red, white and blue LED's entire are connected in series between the positive and negative terminals of the appropriate deep red, white and blue power sources (650DR), (650B), (650W).

Refereeing now to FIGS. 3 and 6, the lamp power module (625) includes all four power sources (650R), (650DR), (650B) and (650W). However, in FIG. 3, two DC power modules (340) and (345) are supported by the transverse end beams (330) and (335). While it is desirable to support the two DC power modules (330) and (335) as shown in FIG. 3, each DC power module of figure three only includes two of the four power sources (650R), (650DR), (650B) and (650W). Thus in an embodiment where the lighting assembly (300) was configured with only two light support beams e.g. (310) and (315) using a single DC power module (345), the power module (345) would require all four power sources (650R), (650DR), (650B) and (650W).

1.6.7 Thermal Energy Management

Referring again to FIG. 4A, the support structure (430) is configured to facilitate rapid thermal energy transfer by thermal conduction from each of the LED lamps (435) to the base wall (405). Additionally, the base wall (405) is configured to facilitate rapid thermal energy transfer by thermal conduction from the support structure (430) to the cooling fluid flowing through the fluid conduit (460). Moreover, in order to provide the conductive traces (715), (755), (775) and (795) to deliver power to each of the LED lamps (435) the support structure (430) is configured to provide a PCB layer, or the like, for supporting the conductive traces.

More specifically the support structure (430) includes a thermally conductive layer (490) and an electrically insulating layer (495). The thermally conductive layer comprises aluminum, or other metal, having a coefficient of thermal conductivity preferably ranging from about 200 to 250 W/m° K. Other metals such as alloys comprising copper, silver and gold are also usable to increase the coefficient of thermal conductivity in a range of 100 W/m° K to 300 W/m° K. The thermal conductive layer (490) is in mating contact with each of the LED lamps (435) in order to provide a substantially uninterrupted thermal conductive path from each LED lamp to the fluid conduit (460), As such the thermally conductive layer (490) may include mounting pads (497) extending therefrom to make mating contact each of the LED lamps (435). During assembly, thermally conductive grease or another thermally conductive fluid may be applied to mating surface to improve thermal conduction. Additionally since the electrically insulating layer (495) is significantly less thermally conductive than the thermal conductive layer (490) this prevent thermal energy from radiating from the thermal conductive layer (490) into the lamp cavity to reduce local heating. Additionally some or all of the exposed surfaces of the U-shaped cross-section (400) with the exception of the inside surface of the base wall (405) that the support structure (430) is mounted onto is coated or otherwise covered by a thermally insulating material (498). The thermally insulating layer (498) reduces thermal radiation from the U-shaped cross-section (400) to the surrounding room air while promoting thermal cooling by thermal conduction to the cooling fluid flowing through the fluid conduit (460).

Figure 9:
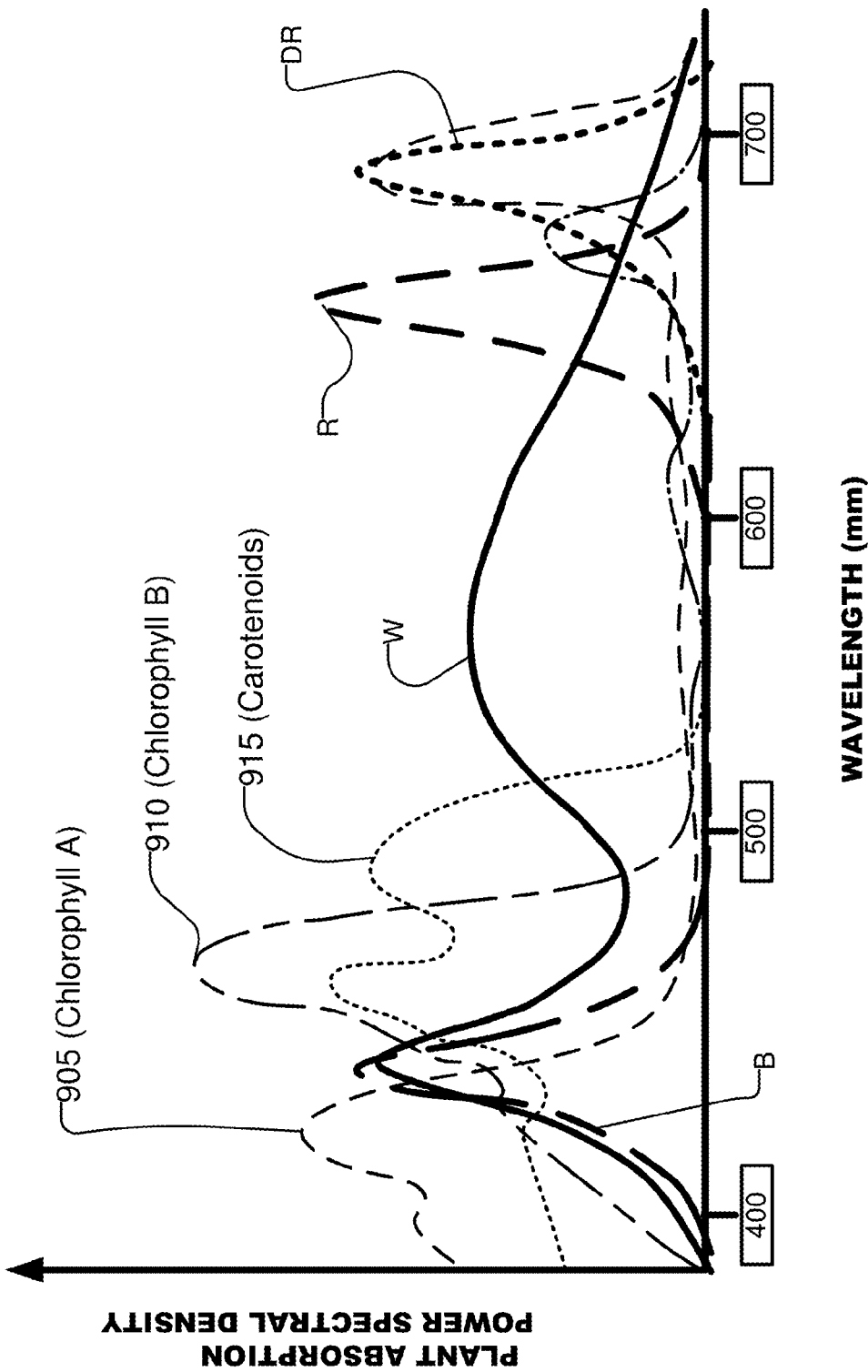
FIG. 9 depicts a graphical plot of the relative absorption characteristics of plant material vs wavelength in nm as well as the relative spectral power of a non-limiting exemplary LED illumination system of the present invention vs wavelength in nm.

Referring now to FIG. 9 a plot (900) shows the relative or normalized spectral power vs wavelength in (nm) of each of the blue LED lamps (B), the white LED lamps (W), the red LED lamps (R) and the deep red LED lamps (DR) used to configure the LED illumination system (600) of the present invention. As shown, the spectral power of the blue LED lamps (B) is centered at about 448 nm with a half width of its bandwidth ranging from about 425 to 470 nm. The spectral power of the white LED lamps (W) has two peaks with a major peak centered at about 450 nm and a minor peak centered at about 570 nm. The half width bandwidth of the white LED lamps (W) roughly ranges from about 420 to 620 nm. The spectral power of the red LED lamps (R) is centered at about 635 nm with a half width of its bandwidth ranging from about 620 to 650 nm. The spectral power of the deep red LED lamps (DR) is centered at about 670 nm with a half width of its bandwidth ranging from about 660 to 680 nm.

In addition to the above described LED illumination systems (600), an alternate embodiment of the present invention includes an LED illumination system that also includes ultraviolet LED lamps having a spectral power with a peak wavelength at about 400 nm and a separate ultraviolet power source.

In addition to above described LED illumination systems (600), an further alternate embodiment of the present invention includes an LED illumination system that also includes infrared LED lamps having a spectral power with a peak wavelength at about 750 nm and a separate infrared power source.

The plot (900) further shows the spectral absorption of plant material vs wavelength in (nm). In particular the spectral absorption of chlorophyll A (905), chlorophyll B (910) and carotenoids (915) are each plotted on the same wavelength scale as the spectral power of each of the different LED lamp types used to configure the LED illumination system (600) of the present invention. As can be readily seen the spectral power of the deep red LED (DR) closely matches the deep red absorption peak of the chlorophyll A absorption curve (905) at about 670 nm.

As can also be seen, each of the spectral power of the deep red LED lamps (DR), the red LED lamps (R) and the white LED lamps (W) overlaps the absorption peak of chlorophyll B, curve (910), at about 460 nm and also overlap the absorption of chlorophyll A, curve (910), at about 430 nm.

As can be further seen, each of the spectral power of the blue LED lamps (B) and the white LED lamps (W) overlaps the absorption of chlorophyll A, curve (905), at about 430 nm and overlaps the absorption of carotenoids, curve (915), at about 475 nm.

As can be further seen the spectral power of the white LED lamps (W) overlaps the absorption of carotenoids, curve (915), at about 490 nm.

Figure 8:
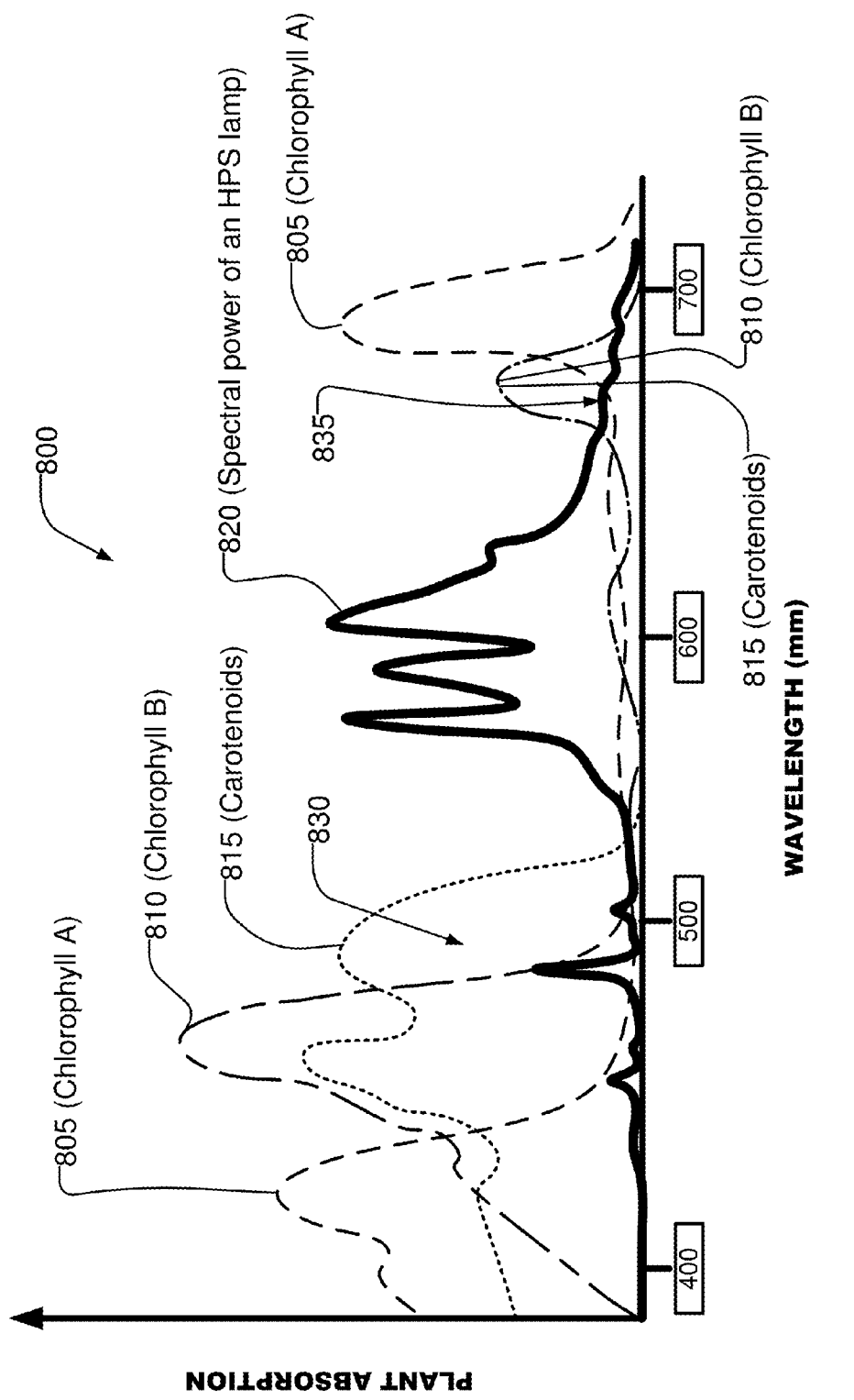
FIG. 8 depicts a graphical plot showing the relative absorption characteristics of plant material vs wavelength in nm as well as the relative spectral power of a conventional HPS lamp vs wavelength in nm.

As compared to the spectral power of a conventional HPS lamp shown by a fourth curve (820) in FIG. 8, it is readily apparent that the combined spectral power of the four different LED types used to configure the LED illumination system (600) of the present invention provides an improved irradiance source for cultivating horticultural products because the combined spectral power of the LED illumination system (600) of the present invention is much more closely matched to absorption of plant materials. Additionally since the LED illumination system (600) is configured to irradiate plant material only using a combined spectral power that is matched to the absorption characteristics of plant materials the system uses less electrical power.

1.7 EXAMPLE 1

The electrical power used by the LED illumination system (600) of the present invention is 950 W total. This power usage can be allocated as follows; white LED lamps 150 (W), blue LED lamps (B) 320 W, red LED lamps (R) 240 W and deep red LED lamps (DR) 240 W. In a first growing cycle example operating mode, only white and blue light are operated for the germination stage. This is possible because during the germination stage the plants absorb more radiation through carotenoids which are prevalent in the plants roots and stems. Thus during the germination stage the power consumption is (470 W) based on only operating the white and blue LED lamps. In a second growing cycle example operating mode, only the white, red and deep red LED lamps are operated during a flowering stage. This is possible because during the flowering stage the plants absorb more radiation through chlorophyll A and chlorophyll B which are prevalent in green leaves. Thus during the flowering stage the power consumption is (630 W) based on only operating the white red and deep red LED lamps.

As compared to conventional lighting systems, such as a HPS lamp, the HPS lamp must be run at all time because there is no way to change its power spectral output. By comparison tests show that the present invention is uses less power to achieve comparable plant growth. For example using only 470 W to irradiate horticultural products during the germination stage and 630 W to irradiate horticultural products during the flowering stage the present provides equal horticultural product development as compared to using a conventional HPS lamp consuming at 1000 W and in some case 2000 W during both growth stages.

1.8 EXAMPLE 2

In an example operating mode the data processor (205) operates a daylight simulation mode wherein LED operating power is gradually varied over a 24 hour cycle to simulate natural sunlight. In another example operating mode the data processor (205) can be operated to operate different LED types at different LED operating power levels e.g. by decreasing the radiant power of all of the white LED's while increasing the radiant power of all of the deep red LED's, or the like.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. irradiating horticultural products, those skilled in the art will recognize that its usefulness is not limited thereto and that the present invention can be beneficially utilized in any number of environments and implementations where it is desirable to vary the spectral power of a light source to match the absorption characteristics of a scene being illuminated. Accordingly, the claims set forth below should be construed in view of the full breadth and spirit of the invention as disclosed herein.

The invention claimed is:

1. A lighting assembly comprising:
   at least two longitudinal light support beams each having a longitudinal length and each assembled with at least two transverse end beams;
   wherein each of the at least two longitudinal light support beams comprises a base wall having a transverse width and two side walls extending from the base wall at opposing edges of the transverse width wherein the base wall and the two side walls form three sides of a lamp cavity that extends substantially along the entire longitudinal length;
   an LED lamp support structure mounted to the base wall inside the lamp cavity substantially along the entire longitudinal length and a plurality of LED lamps mounted to the LED lamp support structure distributed substantially along the entire longitudinal length wherein each of the plurality of LED lamps is oriented to direct radiate power emitted there from out of the lamp cavity; and,
   a fluid conduit thermally conductively coupled to the base wall for conducting a liquid cooling fluid there through.

2. The lighting assembly of claim 1 further comprising a cooling system comprising at least one heat exchanger operable to transfer thermal energy from the liquid cooling fluid; and, a pump operable to cycle the liquid cooling fluid through the fluid conduit and the at least one heat exchanger.

3. The lighting assembly of claim 1 wherein each of the at least two longitudinal light support beams comprises metal having a coefficient of thermal conductivity in the range 100 W/m° K to 300 W/m° K.

4. The lighting assembly of claim 3 wherein each of the at least two longitudinal light support beams comprises an extruded aluminum U-shaped element formed with each of the two side walls extending substantially orthogonal from the base wall at the opposing edges of the transverse width.

5. The lighting assembly of claim 4 further comprising an annular wall extending from an outside surface of the base wall opposed to the lamp cavity wherein the annular wall encloses the fluid conduit substantially along the entire longitudinal length.

6. The lighting assembly of claim 1 wherein the LED lamp support structure comprises a thermally conductive layer disposed between the base wall and each of the plurality of LED lamps.

7. The lighting assembly of claim 6 further comprising an electrically insulating layer disposed in mating contact with the thermally conductive layer; and, a plurality of conductive elements supported by the electrically insulting layer, wherein each of the plurality of LED lamps is electrically interfaced with one of the plurality of conductive elements.

8. The lighting assembly of claim 6 wherein the thermally conductive layer comprises metal having a coefficient of thermal conductivity ranging from 100 W/m° K to 300 W/m° K.

9. The lighting assembly of claim 1 wherein each of the at least two longitudinal light support beams further comprises:
   a lamp cavity cover sealedly interfaced with each of the side walls disposed substantially along the entire longitudinal length;
   a first end cap sealedly interfaced with each of the side walls and with the base wall disposed at a first end of the longitudinal light support beam;

a second end cap sealedly interfaced with each of the side walls and with the base wall disposed at a second end of the longitudinal light support beam; and, wherein each of the first and second end caps is further sealedly interfaced with the lamp cavity cover to substantially moisture seal the lamp cavity.

10. The lighting assembly of claim 9 wherein the lamp cavity cover comprises one of impact resistant plastic and structural glass, having substantially uniform optical transmission over a wavelength range of 350 to 750 nm.

11. The lighting assembly of claim 10 wherein the lamp cavity cover includes two parallel and opposing optical surfaces each treated with a broad spectrum anti-reflection coating layer having substantially uniform anti-reflection performance over the wavelength range of 350 to 750 nm.

12. The lighting assembly of claim 1 further comprising one or more mirrored surfaces disposed inside the lamp cavity wherein each of the one or more mirrored surfaces extends substantially along the entire longitudinal length of the cavity and wherein each of the mirrored surfaces is oriented in a manner that causes radiant power emitted by any of the plurality of LED lamps impinging onto any one of the one or more mirrored surfaces to be reflected out of the lamp cavity.

13. The lighting assembly of claim 1 wherein the plurality of LED lamps comprises a plurality of different LED lamp types wherein each of the different LED lamp types has a different spectral power.

14. The lighting assembly of claim 13 wherein the plurality of different LED lamp types includes:
a blue LED type having a main spectral power output in a spectral range of 425 to 470 nm;
a red LED type having a main spectral power output in a spectral range of 620 to 650 nm; and,
a deep red LED type having a main spectral power output in a spectral range of 660 to 680 nm.

15. The lighting assembly of claim 14 wherein the plurality of different LED lamp types further includes a white LED type having a main spectral power output in a spectral range of 420 to 620 nm.

16. The lighting assembly of claim 15 wherein the plurality of different LED lamp types further includes an ultraviolet LED type having a main spectral power output in a spectral range of 380 to 420 nm.

17. The lighting assembly of claim 16 wherein the plurality of different LED lamp types further includes an infrared LED type having a main spectral power output in a spectral range of 730 to 770 nm.

18. The lighting assembly of claim 13 further comprising:
a lamp power module comprising a plurality of different DC power sources wherein each DC power source is electrically interfaced to all of the LED lamps of only one of the plurality of different LED types;
an electronic controller comprising a data processor in communication a memory module and in communication with each of the plurality of different DC power sources;
wherein the data processor is operable to independently modulate an electrical output power of each the plurality of different DC power sources in a manner that independently modules a radiant power output from each of the plurality of different LED types.

19. The lighting assembly of claim 18 wherein the data processor is operable to independently modulate all of the LED lamps of any one of the LED types over a radiant power amplitude range of substantially zero radiant power to maximum radiant power amplitude of the LED lamp type.

20. The lighting assembly of claim 1 wherein the plurality of LED lamps comprises a plurality of different LED lamp types wherein each different LED lamp type has a different spectral power, wherein the plurality of different LED lamp types includes a blue LED type having a main spectral power output in a spectral range of 425 to 470 nm, a red LED type having a main spectral power output in a spectral range of 620 to 650 nm, a deep red LED type having a main spectral power output in a spectral range of 660 to 680 nm and a white LED type having a main spectral power output in a spectral range of 420 to 620 nm, further comprising;
a lamp power module comprising a plurality of different DC power sources wherein each of the plurality of different DC power sources is electrically interfaced to all of the LED lamps of only one of the plurality of different LED types;
an electronic controller comprising a data processor in communication a memory module and in communication with each of the plurality of different DC power sources;
wherein the data processor is operable to independently modulate an electrical output power of each the plurality of different DC power sources in a manner that independently modules a radiant power output of each of the plurality of different LED types.

21. The lighting assembly of claim 20 further comprising a plurality of LED lamps of an ultraviolet LED lamp type having a main spectral power output in a spectral range of 380 to 420 nm and wherein one of the plurality of DC power sources is electrically interfaced to all of the plurality of LED lamps of the ultraviolet LED lamp type.

22. The lighting assembly of claim 20 further comprising a plurality of LED lamps of an infrared LED lamp type having a main spectral power output in a spectral range of 730 to 770 nm and wherein one of the plurality of DC power sources electrically interfaced to all of the plurality of LED lamps of the infrared LED lamp types.

* * * * *